(12) United States Patent
Banatwala et al.

(10) Patent No.: US 9,246,839 B2
(45) Date of Patent: Jan. 26, 2016

(54) EXTENDING ORGANIZATIONAL BOUNDARIES THROUGHOUT A CLOUD ARCHITECTURE

(71) Applicant: International Business Machines Corporation, Armonk, NY (US)

(72) Inventors: Mustansir Banatwala, Hudson, NH (US); Harold Moss, III, Danvers, MA (US); Robert L. Yates, Arlington, MA (US); Mary E. Zurko, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 13/732,909

(22) Filed: Jan. 2, 2013

(65) Prior Publication Data

US 2014/0189124 A1 Jul. 3, 2014

(51) Int. Cl.
*H04L 12/911* (2013.01)
*H04L 12/58* (2006.01)
*H04L 29/06* (2006.01)
*H04L 29/12* (2006.01)

(52) U.S. Cl.
CPC ............. *H04L 47/70* (2013.01); *H04L 51/22* (2013.01); *H04L 63/20* (2013.01); *H04L 61/1523* (2013.01); *H04L 63/10* (2013.01)

(58) Field of Classification Search
CPC ........................................................ H04L 63/10
See application file for complete search history.

(56) References Cited

U.S. PATENT DOCUMENTS

| | | | |
|---|---|---|---|
| 8,578,442 B1* | 11/2013 | Banerjee | 726/1 |
| 2010/0262717 A1* | 10/2010 | Critchley et al. | 709/251 |
| 2011/0082920 A1* | 4/2011 | Bhattacharya et al. | 709/221 |
| 2011/0131275 A1 | 6/2011 | Maida-Smith et al. | |
| 2011/0179134 A1 | 7/2011 | Mayo et al. | |
| 2011/0179176 A1 | 7/2011 | Ravichandran | |
| 2011/0209194 A1 | 8/2011 | Kennedy | |
| 2012/0042003 A1* | 2/2012 | Goetz et al. | 709/203 |
| 2012/0158578 A1* | 6/2012 | Sedayao et al. | 705/39 |
| 2012/0265976 A1* | 10/2012 | Spiers et al. | 713/2 |
| 2012/0304262 A1* | 11/2012 | Cucco et al. | 726/6 |
| 2013/0031028 A1* | 1/2013 | Martin | 705/400 |
| 2013/0036213 A1* | 2/2013 | Hasan et al. | 709/223 |
| 2013/0160105 A1* | 6/2013 | Huang et al. | 726/8 |
| 2014/0129389 A1* | 5/2014 | Patel et al. | 705/26.62 |
| 2014/0130142 A1* | 5/2014 | Plewnia | 726/5 |
| 2014/0189348 A1* | 7/2014 | El-Shimi et al. | 713/165 |
| 2014/0282821 A1* | 9/2014 | Adler et al. | 726/1 |
| 2014/0331297 A1* | 11/2014 | Innes et al. | 726/7 |
| 2015/0006733 A1* | 1/2015 | Khan et al. | 709/226 |

* cited by examiner

*Primary Examiner* — Lashonda Jacobs
(74) *Attorney, Agent, or Firm* — David B. Woycechowsky; David H. Judson (57) ABSTRACT

An information sharing paradigm for a cloud computing solution enables flexible organizational boundaries with respect to cloud resources. Cloud service customers manage their own organization boundary but can extend that boundary selectively by associating cloud resources they own with sets of domain names that may be associated with requests for cloud resources that the organization may be willing to share with other organizations that are using the cloud environment, and by ensuring that any such requests for resources that are shared in this manner are associated with one or more message handling policies that have been defined by (or otherwise associated with) the resource-owning organization. Cloud resources owned by an organization (even those marked as "internal only") may be selectively shared with one or more other organizations using the cloud environment depending on the domain names associated with the requests. Message handling policies are enforced with respect to shared resources.

14 Claims, 6 Drawing Sheets

EXTENDING ORGANIZATIONAL BOUNDARIES THROUGHOUT A CLOUD ARCHITECTURE

BACKGROUND OF THE INVENTION

1. Technical Field

This disclosure relates generally to extending organizational boundaries in a cloud computing operating environment in which resources are hosted in a shared pool of configurable computing resources.

2. Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP.

Currently, organizations that leverage the cloud to provide solution services to their customer bases also are looking to implement notions of organizational boundaries that would allow them to control access to information as well as interactions between and among their constituencies. The concept of a "community cloud" would enable companies in many different types of industries to leverage cloud technology to expand and transform their business. Thus, for example, an agent-based insurance Company that relies heavily on independent agencies as a channel to reach customers may have an interest in sharing resources and services (using the cloud) while at the same time limiting which agents can talk to other agents in a chain. While some cloud-based solutions provide their users with application-specific flexibility in defining the scope of an organizational boundary, there remains a need to provide a more robust solution wherein the concept of organizational boundaries is fully extensible throughout a cloud so that users can control access to information and enforce policies around interactions across those boundaries.

BRIEF SUMMARY

This disclosure describes a method and system for extending organizational boundaries throughout a cloud-based architecture. The technique provides a new information sharing paradigm for a cloud computing solution that enables flexible organizational boundaries with respect to cloud resources. Cloud service customers manage their own organization boundary but can extend that boundary selectively by associating cloud resources they own with sets of domain names that may be associated with requests for cloud resources that the organization may be willing to share with other organizations that are using the cloud environment, and by ensuring that any such requests for resources that are shared in this manner are associated with one or more message handling policies that have been defined by (or otherwise associated with) the resource-owning organization. Cloud resources owned by an organization (even those marked as "internal only") may be selectively shared with one or more other organizations using the cloud environment. Message handling policies are enforced with respect to shared resources.

In one embodiment, a method of extending organizational boundaries is implemented in a cloud environment wherein cloud resources are being shared by a plurality of organizations and there is a need to extend an organization's boundary with respect to one or more cloud resources. In this environment, a cloud resource is marked as being owned by one of a plurality of organizations that operate in the cloud environment. Typically, ownership is assigned on the basis of one of more factors, such as business ownership of the resource, administrative responsibility for the resource, or creation of the cloud resource by an owning user assigned to a particular organization. One or more respective sets of domain names are registered to each of the plurality of organizations, and messages from users assigned to a respective organization incorporate one of the set of domain names assigned to the respective organization. Each organization may also establish separate message handling policies that apply to the organization (and, optionally, for respective objects owned by the organization) with respect to a cloud resource. According to the method, when a user requests permission to access a cloud resource, whether and how such access are permitted depends on the ownership of the cloud resource (as determined by the marking) as well as the domain name(s) used by the requesting user in making the access request. If, based on the ownership and domain name checks, the user is provided access to the cloud resource, the appropriate message handling policy also is applied.

The above-described approach enables organizational boundary notions to be embedded into cloud-based applications while enabling enforcement of various policies around interactions across those boundaries.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
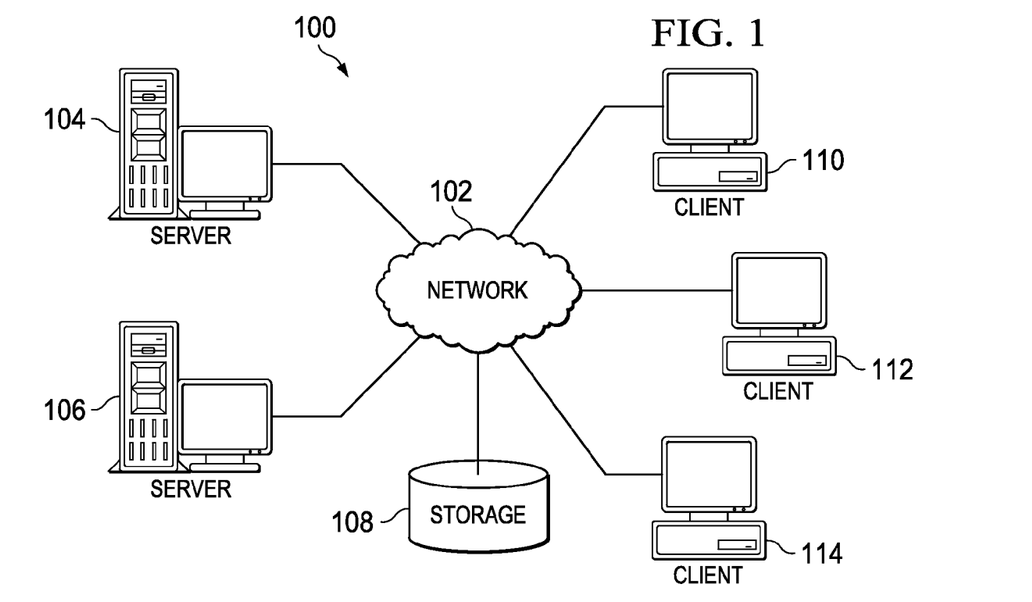
FIG. 1 depicts an exemplary block diagram of a distributed data processing environment in which exemplary aspects of the illustrative embodiments may be implemented.
Figure 2:
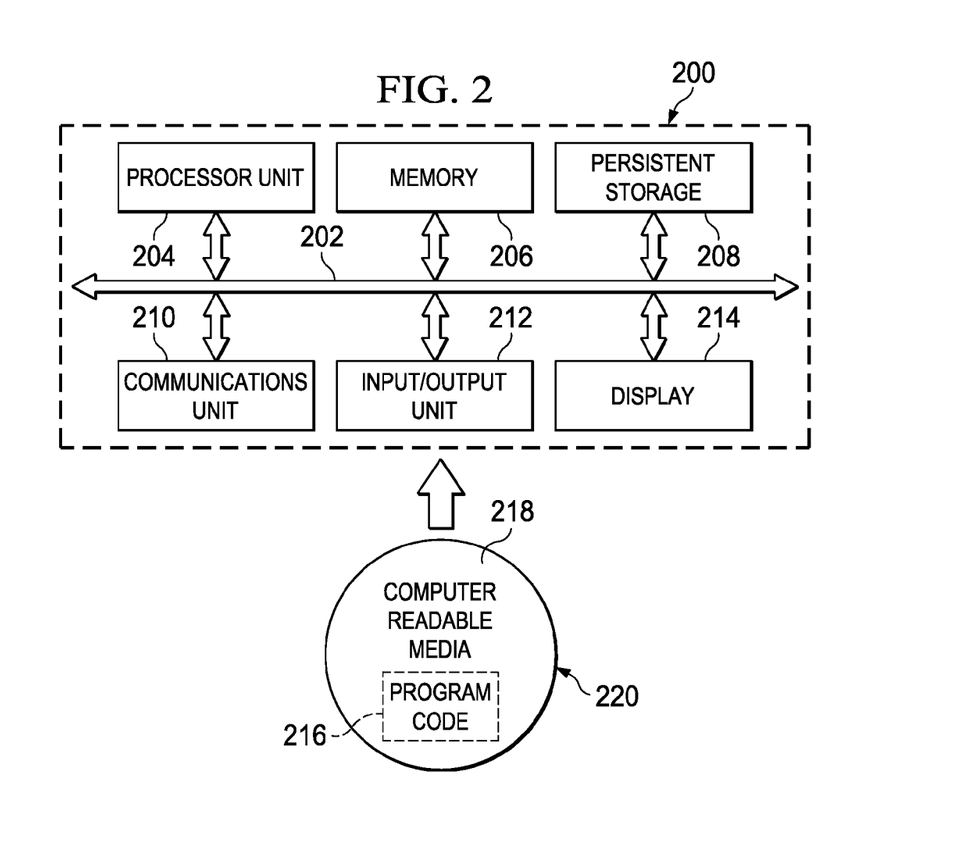
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

The Client-Server Model

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The standard client-server paradigm such as illustrated in FIG. 1 is one in which client machines communicate with an Internet-accessible Web-based portal executing on a set of one or more machines. In particular, end-users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

By way of additional background, as used herein an "assertion" provides indirect evidence of some action. Assertions may provide indirect evidence of identity, authentication, attributes, authorization decisions, or other information and/or operations. An authentication assertion provides indirect evidence of authentication by an entity that is not the authentication service but that listened to the authentication service. As is known in the art, a Security Assertion Markup Language (SAML) assertion is an example of a possible assertion format that may be used with the present invention. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May 31, 2002, as follows.

The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

The SAML specification states that an assertion is a package of information that supplies one or more statements made by an issuer. SAML allows issuers to make three different kinds of assertion statements: authentication, in which the specified subject was authenticated by a particular means at a particular time; authorization, in which a request to allow the specified subject to access the specified resource has been granted or denied; and attribute, in which the specified subject is associated with the supplied attributes.

Authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically, but not necessarily, a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, and so forth. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

The Cloud Computing Model

By way of additional background, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over systems and devices (e.g., operating systems, storage, deployed applications, etc.), and possibly limited control of select networking components (e.g., host firewalls).

The Deployment Models typically are as follows:

Private cloud: the cloud infrastructure is operated solely for an organization. It may be managed by the organization or a third party, and it may be on-premises or off-premises.

Community cloud: the cloud infrastructure is shared by several organizations and supports a specific community that has shared concerns (e.g., mission, security requirements, policy, and compliance considerations). It may be managed by the organizations or a third party, and it may be implemented on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
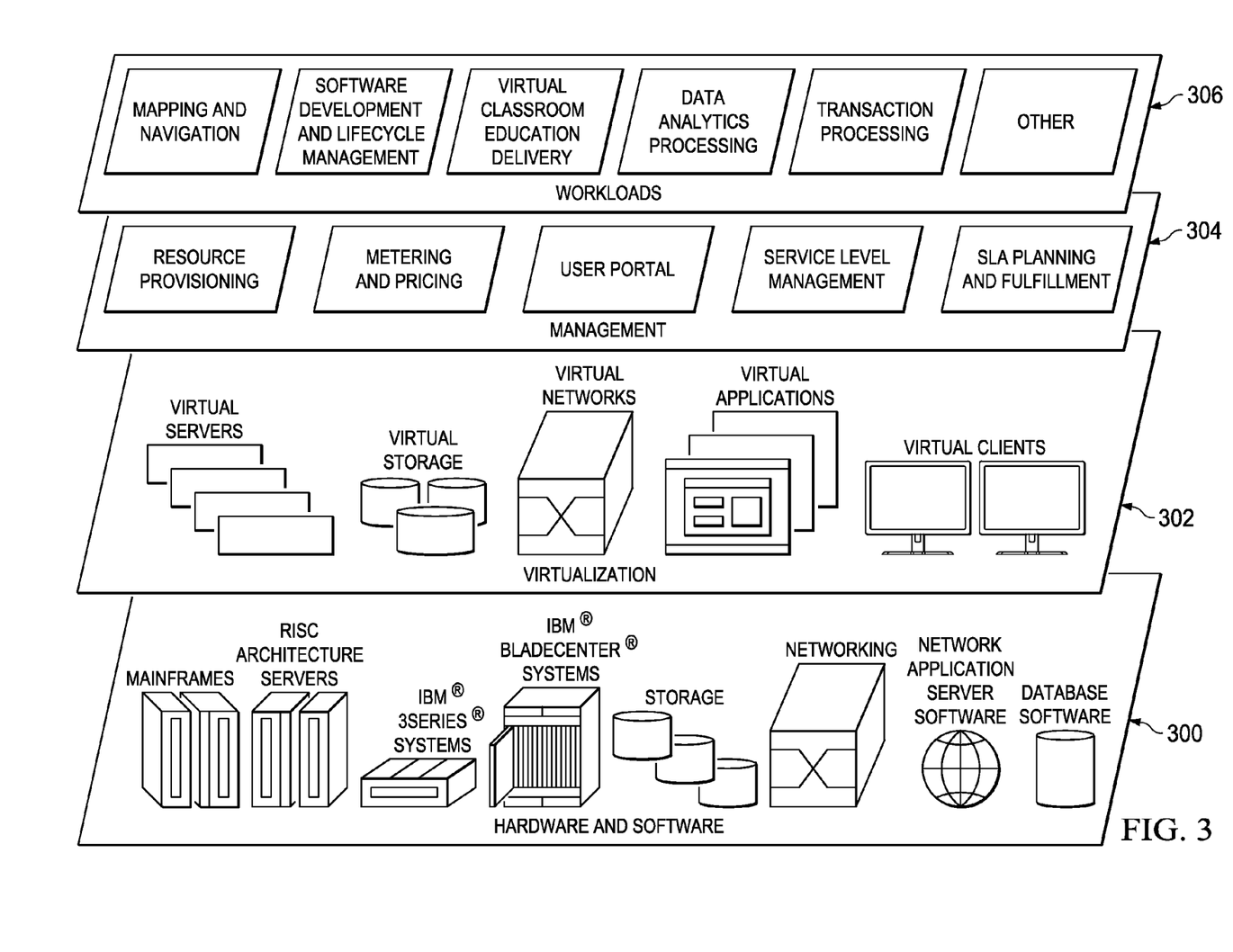
FIG. 3 depicts abstraction model layers of a cloud compute environment in which organizational boundaries may be extensible according to an embodiment of the invention.
Figure 4:
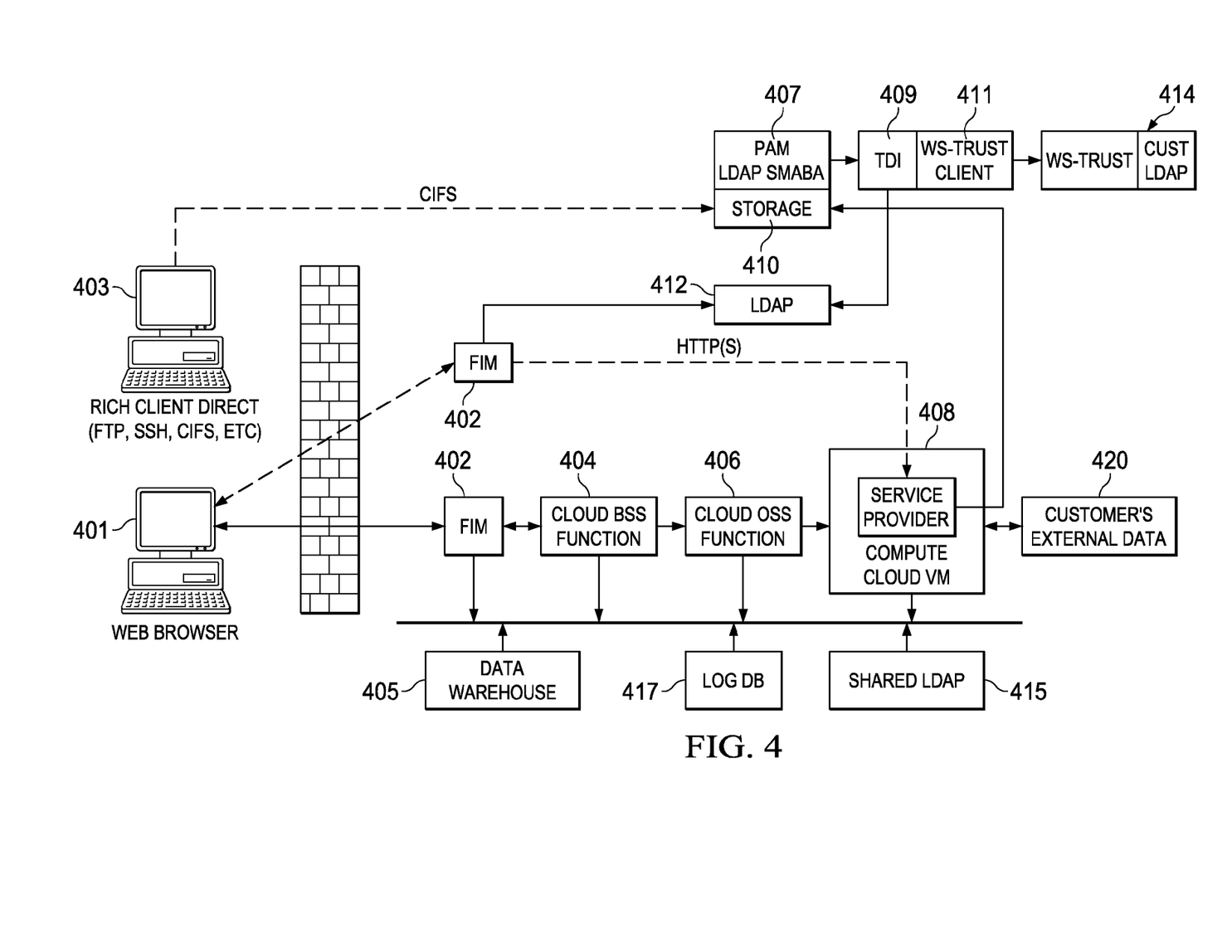
FIG. 4 is an exemplary block diagram illustrating a known cloud computing environment and the cloud resources allocated to a deployed customer application.

Referring now to FIG. 3, by way of additional background, a set of functional abstraction layers provided by a cloud computing environment is shown. It should be understood in advance that the components, layers, and functions shown in FIG. 4 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide F-SSO to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute the target application 410 that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud.

By way of example only, a representative enterprise application deployed in the cloud is a client-server application such as IBM® SmartCloud (formerly LotusLive), which provides a cloud-delivered suite of technologies that combine web conferencing, messaging, and collaboration services with social networking capabilities in an easy-to-use web-based environment. As a component of IBM® SmartCloud, Notes® provides a full-featured email, calendaring, contact management, and instant messaging. A user can access the service directly over the Internet in a number of ways, such as using a web browser, or a "rich" client application (such as the Notes rich client). Using this service, an enterprise places in the cloud service its email, calendar and/or collaboration infrastructure, and a user uses the Notes client to access his or her email, perform a calendar operation, or facilitate an online collaboration. In a representative embodiment, the Notes rich client is Version 8.5.2 or higher.

The above example (using IBM SmartCloud) is merely representative. The techniques described below are not limited for use with a particular application deployed within the cloud environment.

FIG. 4 illustrates a representative embodiment of the application upon its deployment. In this embodiment, the cloud provider 400 comprises a set of common management platform components. These components include one or more instances of the identity manager 402, the cloud BSS function 404, and the cloud OSS function 406, all of which were described above with respect to FIG. 3. The compute cloud 408 comprises the virtual machine instances that provide the computing infrastructure, including storage 410 used by the application. In this example, a set of common management platform components also comprise a pam_ldap module 407, which provides a means for Linux or UNIX servers and workstations to authenticate against LDAP directories, a directory integrator module (TDI) 509 that transforms and synchronizes identity data residing in heterogeneous directories, databases, files, collaborative systems and applications, a LDAP directory service 412, and a security token service (not shown). The security token service uses secure messaging mechanisms of Web Services Trust (WS-Trust) to define additional extensions for the issuance, exchange, and validation of security tokens. WS-Trust is an OASIS standard that enables security token interoperability by defining a request/response protocol. The WS-Trust protocol allows a Web service client to request of some trusted authority that a particular security token be exchange for another. To that end, a WS-Trust client 411 forms part of the common management and interfaces to a customer's LDAP 414 (through a customer side WS-Trust client) as shown. The customer's external data is supported in database 420. The common management platform also includes data warehouse 405, log database 417, and a shared LDAP 415. Client access is provided via a web browser 401 or via a "rich" client, i.e. a machine supporting a direct access client, such as CIFS (or the like). As shown, normally the identity manager component 402 interfaces to the cloud computing infrastructure via secure HTTP, while normally the rich client interfaces to the storage 410 via CIFS.

For those users who will have a U/P managed by the cloud provider 400, their F-SSO SAML assertion may include the U/P, or it may include a username only; in either case, the cloud provider presents the user with a simple interaction to establish a cloud-side password for access to cloud services. The user then has an account created at the cloud LDAP 412, and that account is marked as a "local authentication" user, and the user's password also is managed by LDAP. When the user attempts to access the storage 410, the pam_ldap module 407 intercepts the U/P and attempts to validate them. In this approach, a proxy (such as TDI 409) is the recipient of this U/P validation request. The proxy will first establish if this is a local user (and thus authenticates locally); if so, the proxy attempts to validate the U/P against the local LDAP 412. If the user is not a "local" user, however, the proxy generates a WS-Trust request and, using WS-Trust client 411, requests validation of the user's password from the user's identity provider (customer LDAP 414). In this approach, it is not required that the cloud provider manages a user's password, but it is still possible to do this for those customers that do not wish to establish a full proxy solution. In the above example, the use of WS-Trust is merely representative.

Extending Organizational Boundaries Throughout the Cloud

With the above background, the subject matter herein is now described.

As used herein, an "organization" typically is an entity that carries on some type of commercial, non-commercial or governmental activities. A typical organization is a business entity, but this is not a limitation.

Figure 5:
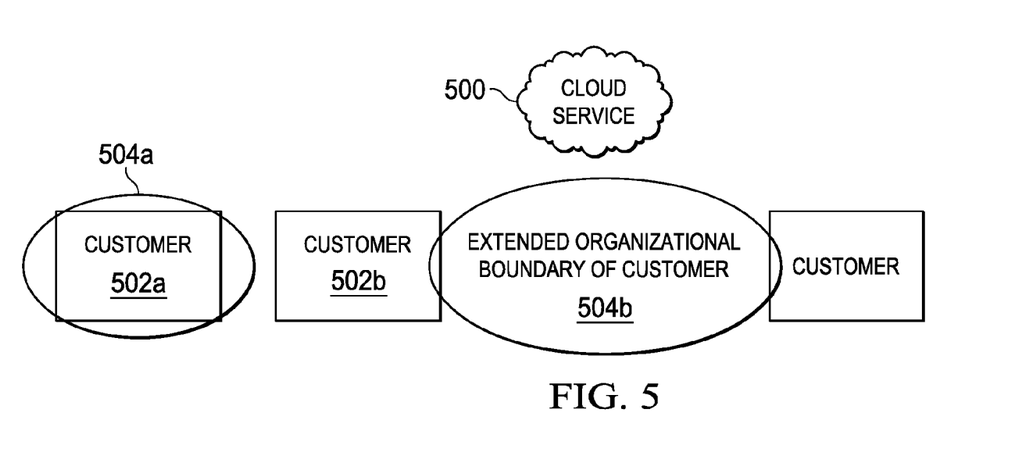
FIG. 5 illustrates how an organization that uses the cloud service extends its organizational boundary according to the techniques of this disclosure.

As noted above, the subject disclosure enables organizations that use a cloud service to extend their organizational boundaries with respect to cloud resources that they own or control. In this approach, and as shown in FIG. 5, it is assumed that a cloud service 500 is being used for a plurality of cloud service customers, designated by references 502*a-n*. Each cloud server customer 502 has an associated organizational boundary 504 that, typically, is defined by one or more organizational constructs including, without limitation, user or group identities, computing resources (such as servers or services within the company and that are outside of the cloud), and objects (such as applications, files, data, and the like). Of course, the nature and extent of an organizational boundary 504 varies depending on the type of organization, the industry in which the organization operates, and other factors. In the context of this disclosure, an organization 502 that uses the cloud service 500 desires to "extend" its organizational boundary with respect to at least one cloud resource that it "owns" (as will be defined below) and with respect to at least one other organization that is also using the cloud service. In the example scenario, cloud service customer 502*b* has extended its organizational boundary 504*b* so that the boundary overlaps with one or more other cloud service customers (i.e., one or more other organizations). By extending its organizational boundary in this manner, the organization 502*b* and the one or more other cloud service customers comprise a cloud "community" with respect to a cloud-based application. As will be seen, this approach of embedding organizational notions into the application and enforcing various policies around interactions across the new (i.e., the extended) boundary provides significant advantages.

As used herein, the term "extending" as it relates to an organizational boundary may be deemed to include any modification or alteration of an existing boundary that facilitates sharing on a cloud resource that is otherwise considered to be "owned" by a particular organization that is using the service. As used herein, the term "owned" as it relates to a cloud resource means one or more of the following: business ownership of the resource, administrative responsibility for the resource, and/or creation of the cloud resource. The creation may be by a particular owning user assigned to a particular organization. The word "owner" may also refer to an organization that controls or manages the resource. A "cloud resource" is typically an object, such as a database, a file system, a folder, a file, given data, or the like, but it may also be some other computing resource such as an application, a utility, a tool, a program, an execution thread, or the like. An "organizational boundary" associated with a cloud service customer is defined by the cloud resources that it owns.

Figure 6:
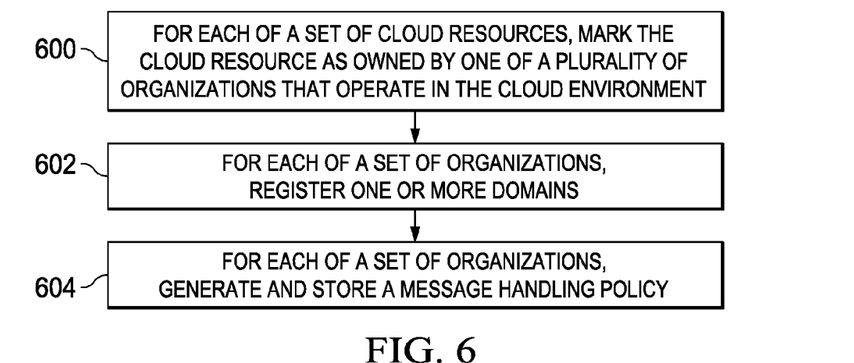
FIG. 6 illustrates representative steps to configure the cloud service to provide the functionality.

According to this disclosure, and as illustrated in FIG. 6, organizational boundaries are first "configured" or provisioned. Thus, in step 600, and for each of a set of cloud resources, the cloud resource is marked as owned by one of a plurality of organizations that operate in the environment. The step may be carried out for all of the cloud resources, or some subset thereof. In step 602, and for one or more of the plurality of organizations that operate in the environment, a set of one or more domain names are registered. Step 602 may be carried for each of the organizations (or some defined subset of the organizations that may implement the described functionality). Messages from users associated with a respective organization using the cloud service incorporate a domain name of the set of one or more domain names associated with the respective organization. At step 604, and for one or more of the plurality of organizations that operate in the environment, a message handling policy is provided or configured. As used herein, a "message handling policy" is a set of one more rules (e.g., defining actions, conditions, restrictions, and the like) that are to be applied with respect to a cloud resource owned by an organization. The message handling policy may be expressed in a machine-readable language, such as XML. Typically, the message handling policy identifies how the particular cloud resource is permitted to be shared within the cloud environment externally to the organization. Several non-limiting examples are various message handling policies are set forth below.

There are numerous ways to configure or provision the information required in steps 600, 602 and 604 in FIG. 6. Of course, the steps may be carried out in any order, or concurrently. For example, a permitted user may provision this information using a web-based configuration, via a programmatic interface, or the like. The information may be supplied to the cloud service from one or more external sources.

Figure 7:
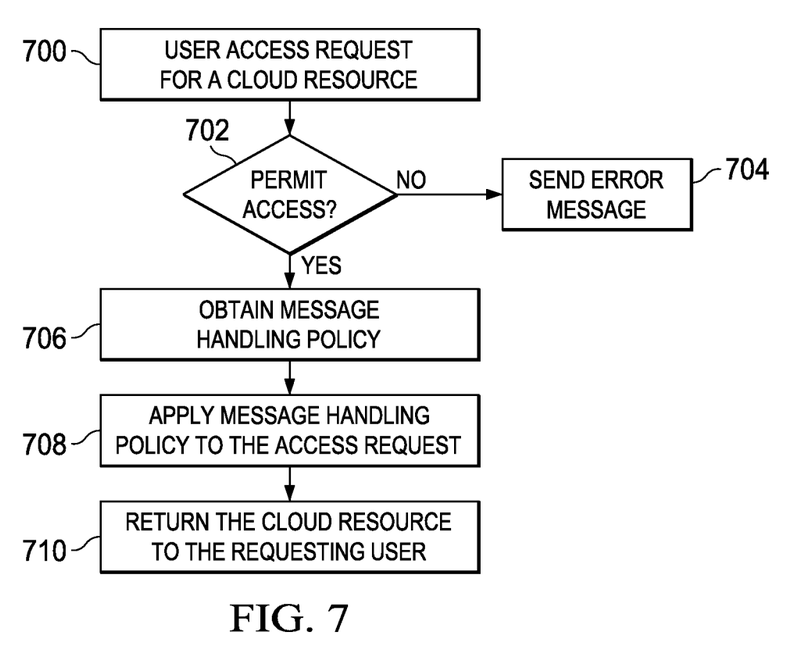
FIG. 7 is a process flow illustrating how a user request is processed against the configuration.

FIG. 7 illustrates a typical use case wherein a user requests access to a cloud resource. According to this disclosure, whether the user is permitted to access the cloud resource depends on the information provisioned in FIG. 6. Thus, whether or not the user is permitted access and, if so, under what conditions, is determined by which organization owns the cloud resource, a domain name associated with the user (and associated with the request), and the message handling policy associated with the cloud resource. The routine assumes that the organization boundary information has been configured as has been described. The routine begins at step 700 with a user requesting access to the cloud resource in connection with an application for which organization boundaries may be extended. At step 702, a determination is made whether to permit access to the cloud resource. If the outcome of the determination is negative, an error response or other such notification is returned (and access denied); this is step 704. If, however, access to the cloud resource is to be permitted, the routine continues at step 706 to obtain the applicable message handling policy. At step 708, the message handling policy is applied. The routine then continues at step 710 to enable the requesting user to access the cloud resource. Step 710 may also include providing information to the requesting user, with the information being as defined in the message handling policy. The process shown in FIG. 7 may be invoked every time the cloud resource is shared externally to the owner, the first time the cloud resource is shared, the first time it is shared to a user in a "new" company, or the like. The determination about how frequent to invoke the checks also may be defined in a policy.

A particular message handling policy applicable to a cloud resource may be defined and managed by a policy management system, such as IBM Tivoli Policy Manager. Using this type of tool, the owning company can define policies that can then be applied to users/subscribers (or associated single sign-on or identity providers), that enable and disable access to certain users or otherwise provide view, copy or other use restrictions, that provide particular announcements or terms of use, that provide configurable responses, and the like. Other items that may be useful to control (or to otherwise have under per company policy) are anti-spam settings. The nature and type of message handling policy will depend on the owning company, the cloud resource, the extent to which the organization boundary is to be extended, and the like.

The following examples illustrate how an organization may extend its boundary to facilitate cloud resource sharing across associated organizations according to this disclosure. These examples are not intended to be limiting.

In a first example scenario, an object is marked by an owning company (where such marking may be propagated from the company of the initial creator, whether an actual owner or administrator or other person/role). The owning company has declared a set of domain names (such as used in email), and these domain names may also be associated with non-subscribed users (enabling such users to be treated as "in company"). According to this disclosure, one or more of those domains are registered with the service, perhaps with an automated check that the domains being registered are in fact controlled by the company administrator. Then, when a request for the object is made, a determination is made that the request is associated with one of the domain names. If so, access to the request may be permitted, subject to the applicable message handling policy. In this example, it is assumed that the message handling policy includes the condition(s) under which the access is permitted by a subscriber and a non-subscriber. In the case of non-subscribed user, for example, the associated message handling policy might provide that the object can only be delivered in response to the request if a message associated with the response (such as a URL to the object) includes a nonce or other one-time use code that ensures that the user can only access the object on a restricted basis. This enables the object to be shared with members of the organization (as indicated by the domain names) and other non-subscribed users. Another way of thinking about these non-subscribed users is that the disclosed technique enables such users to be deemed "in-company" but only with respect to the conditions that are set forth in the applicable message handling policy.

As a second example, the message handling policy implements a request handling strategy that permits access to the cloud resource if the requesting user is external to the owning company yet the request originates from a permitted domain (as reflected in one of the registered domain names). In this example, however, it is desired to protect the privacy of the requesting user yet still provide an accurate log of the request event. In such case, the message handling policy is further configured to cause the system to log the activity but in a unique way. In particular, and according to the policy, as the log entry is written, the requesting user's name is stripped out (or otherwise masked). The log entry of the object-owning company, however, includes the domain associated with the request user and the user's organization name, are entered in the log file of the object-owning company.

In another example scenario, the cloud resource is marked as "internal only." Typically, attempts to share the resource with users outside of the company associated with the object would be denied. Using the approach of this disclosure, however, one or more domain (or sub-domain) names associated with actors from permitted domains (or sub-domains) are registered, which has the effect of extending the identities in the object-owning company that may obtain permitted access to the resource. When an object is shared "externally" in this manner, the message handling policy may designate text (or some other message or notice) that is to be shown to the requesting user. The text also may be customized or it may be default text, e.g., text that is specified by the object-owning company and that accompanies the object when it is shared to a user. Thus, for example, the text may explain or set forth a company policy regarding the information, and that policy may include a re-sharing restriction. The customized text may vary depending on whether the user sharing is in-company or external to the company. If the requesting user is outside the company the policy may also identity a person in the object-owning company to be notified of the sharing event.

As another variant, a message handling policy may require that a specific user action be taken (e.g., a use condition reviewed and an acknowledgement of such review given) before final access to the cloud resource is permitted.

As another variation, a message handling policy may further configure the system to provide a notification of the external sharing to an entity, such as a system administrator for the object-owning company, a cloud service administrator, to an internal user specified by the user, or some other person or entity. Such a notification may further require that any such approver provide advance approval before the resource can be accessed, or it may enable the notified person to revoke or deny access upon a certain condition, or the like.

As a further variant, and if the system supports re-sharing of the cloud resource, re-sharing can be disabled when a particular resource is shared for users that are outside of the company or associated with a domain that is not on the list of registered domains.

An extension of a user being a member (or unaffiliated guest) of exactly one company is to associate a "role" with the user and then having the role represent the user when interacting with another company. This may be an explicit assumption of such a role ("I am now visiting Company Y") or implicit ("when I interact with object or views that are Company Y owned"). Organizations may have a process of administrative (or other) approval before a user can be a visitor of their company. The particular policy of course may vary. For example, the process may involve a fee or other arrangement (e.g., companies can be charged for numbers or tiers of visitors, a company X allowing a visitor from another company Y can charge company Y, and so on).

When in a visitor role, objects created by the user may be deemed owned by the company being visited. This allows a quota or other metric to be applied consistently to the company that hosts the object. Where one or both organizational boundaries are extended according to the techniques of this disclosure, both (or all, if more than two) companies may have policies on what happens when a user is deleted from the system (or if their objects are removed or assigned to another user). Multi-policy engines may be used for configuration of such policies, and enforcing of such policies must be done carefully to ensure that the object ownership remains appropriate.

Operations that require objects from multiple companies may be provisioned (once again by a policy) to require that a user perform certain operations or follow certain procedures (e.g., cloning an object from another company, with appropriate stripping, notifications and restrictions). For example, a file cloned from company X to company Y may be done but only when the owner has an approved role in both companies and the new file is first stripped of any comments or other metadata. Or, the file itself may be shared with comments and metadata per company (including access control) remaining intact.

Preferably, the notion of "internal" activities remains conventional, meaning that "internal" is in reference to subscribers whose home company is the object-owning company.

Figure 8:
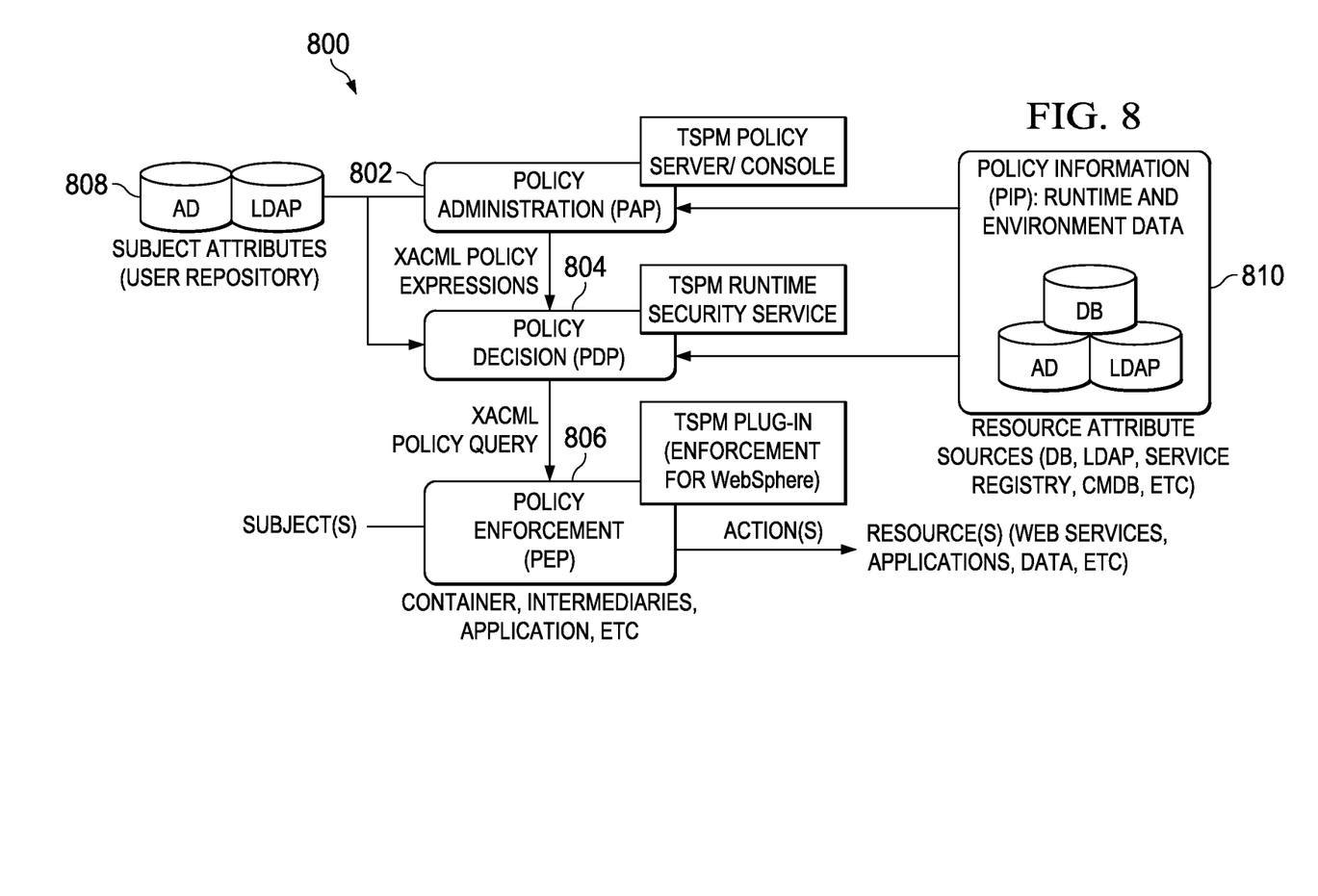
FIG. 8 is a policy management system for configuring and managing a message handling policy according to this disclosure.

As noted above, the particular message handling policy may enforce any type of condition or restriction, or provide any type of notification. Generalizing, the message handling policy is generated and enforced as illustrated in FIG. 8. In particular, FIG. 8 illustrates a representative enterprise policy management system 800 that may be used to configure and enforce a particular message handling policy according to this disclosure. The system 800 may be implemented across one or more machines operating in a computing environment, such as shown in FIG. 1. Typically, the system comprises a policy administration point (PAP) 802, the policy decision point (PDP) 804, and a policy enforcement point (PEP) 806. Generally, the policy administration point 802 is used to define a policy, which may be specified as a set of XACML policy expressions, such as cloud resource message handling policy. This policy may use subject attributes provided from a user repository 808, as well runtime and environment data received from policy information point (PIP) 810. The policy decision point (PDP) 804 receives similar information and responds to an XACML policy query received from the policy enforcement point (PEP) 806 to enforce the policy on a subject and with respect to a particular action initiated by the subject. The PDP 804 implements the policy decision.

The technique can be used within the context of a public cloud, a private cloud, or a hybrid (public-private) cloud.

The described subject matter has numerous advantages. The main advantage of the approach enables organizational boundary notions to be embedded into cloud-based applications while enabling enforcement of various policies around interactions across those boundaries. As has been described, cloud service customers manage their own organization boundary but can extend that boundary selectively by associating cloud resources they own with sets of domain names that may be associated with requests for cloud resources that the organization may be willing to share with other organizations that are using the cloud environment, and by ensuring that any such requests for resources that are shared in this manner are associated with one or more message handling policies that have been defined by (or otherwise associated with) the resource-owning organization. Using this approach, cloud resources owned by an organization may be selectively shared with one or more other organizations also using the cloud environment. Many varied types of message handling policies can then be enforced with respect to shared resources using a conventional policy management system. The technique provides a new information sharing paradigm for a cloud computing solution that enables flexible organizational boundaries with respect to cloud resources.

The cloud service functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, Liberty, Shibboleth, OpenID, WS-Federation, Cardspace, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

As the above examples illustrate, one or more of described functions may be hosted within or external to the cloud.

Still more generally, the subject matter described herein can take the form of an entirely hardware embodiment, an entirely software embodiment or an embodiment containing both hardware and software elements. In a preferred embodiment, the layered logout function is implemented in software, which includes but is not limited to firmware, resident software, microcode, and the like. The data can be configured into a data structure (e.g., an array, a linked list, etc.) and stored in a data store, such as computer memory. Furthermore, as noted above, the identity provider instance discovery functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the cloud service components are implemented in a special purpose computer, preferably in software executed by one or more processors. Associated data for use therein is stored in an associated data store. The software also is maintained in one or more data stores or memories associated with the one or more processors, and the software may be implemented as one or more computer programs.

As has also been described, one or more of the above-described functions may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. Apparatus for extending organizational boundaries in an environment wherein computing resources are hosted in a shared pool of configurable computing resources, comprising:
    a processor;
    computer memory holding computer program instructions executed by the processor, the computer program instructions comprising program code to perform a set of operations that include:
        for each cloud resource of a set of cloud resources, marking the cloud resource as owned by one of a plurality of organizations that operate in the environment;
        for one or more of the plurality of organizations that operate in the environment, registering a set of one or more domain names, wherein messages from users associated with a respective organization incorporate a domain name of the set of one or more domain names associated with the respective organization;
        for one or more of the plurality of organizations that operate in the environment, providing a message handling policy associated with the respective organization with respect to a particular cloud resource owned by the respective organization, the message handling policy identifying how the cloud resource owned by the respective organization is permitted to be shared within the environment externally to the respective organization;
        receiving a request from a user to access a cloud resource;
        in response to the request, determining whether to permit the user access to the cloud resource associated with the request according to the ownership of the cloud resource and the domain name associated with the request; and
        when the user is permitted access to the cloud resource associated with the request, enforcing a message handling policy associated with the cloud resource.

2. The apparatus as described in claim 1 wherein ownership of the cloud resource is marked on the basis of one of: business ownership of the cloud resource, administrative responsibility for the cloud resource, and creation of the cloud resource by an owning user assigned to a particular organization.

3. The apparatus as described in claim 1 wherein a message handling policy for the cloud resource masks a user name of the user making the request while retaining in a log file of the organization that owns the cloud resource the domain name and organization associated with the request.

4. The apparatus as described in claim 1 wherein a message handling policy for the cloud resource provides the user with a nonce to control access to the cloud resource if the user is not associated with one or more domain names associated with the organization that owns the cloud resource.

5. The apparatus as described in claim 1 wherein a message handling policy for the cloud resource provides a custom text defining one or more terms of use associated with the cloud resource if the requesting user is associated with a domain name outside of the set of domain names associated with the organization that owns the cloud resource.

6. The apparatus as described in claim 5 wherein the message handling policy further comprises providing a notification of external sharing of the cloud resource to a designated entity.

7. The apparatus as described in claim 1 wherein the operations further include:
    determining whether the user making the request has an associated visitor role; and
    wherein permitting the user access to the cloud resource also depends on whether the user has been determined to have the associated visitor role.

8. A computer program product in a non-transitory computer readable medium for use in a data processing system for extending organizational boundaries in an environment wherein computing resources are hosted in a shared pool of configurable computing resources, the computer program product holding computer program instructions which, when executed by the data processing system, perform a set of operations comprising:

for each cloud resource of a set of cloud resources, marking the cloud resource as owned by one of a plurality of organizations that operate in the environment;

for one or more of the plurality of organizations that operate in the environment, registering a set of one or more domain names, wherein messages from users associated with a respective organization incorporate a domain name of the set of one or more domain names associated with the respective organization;

for one or more of the plurality of organizations that operate in the environment, providing a message handling policy associated with the respective organization with respect to a cloud resource owned by the respective organization, the message handling policy identifying how the cloud resource is permitted to be shared within the environment externally to the respective organization;

receiving a request from a user to access a cloud resource;

in response to the request, determining whether to permit the user access to the cloud resource associated with the request according to the ownership of the cloud resource and the domain name associated with the request; and when the user is permitted access to the cloud resource associated with the request, enforcing a message handling policy associated with the cloud resource.

9. The computer program product as described in claim 8 wherein ownership of the cloud resource is marked on the basis of one of: business ownership of the cloud resource, administrative responsibility for the cloud resource, and creation of the cloud resource by an owning user assigned to a particular organization.

10. The computer program product as described in claim 8 wherein a message handling policy for the cloud resource masks a user name of the user making the request while retaining in a log file of the organization that owns the cloud resource the domain name and organization associated with the request.

11. The computer program product as described in claim 8 wherein a message handling policy for the cloud resource provides the user with a nonce to control access to the cloud resource if the user is not associated with one or more domain names associated with the organization that owns the cloud resource.

12. The computer program product as described in claim 8 wherein a message handling policy for the cloud resource provides a custom text defining one or more terms of use associated with the cloud resource if the requesting user is associated with a domain name outside of the set of domain names associated with the organization that owns the cloud resource.

13. The computer program product as described in claim 12 wherein the message handling policy further comprises providing a notification of external sharing of the cloud resource to a designated entity.

14. The computer program product as described in claim 8 wherein the method further includes:

determining whether the user making the request has an associated visitor role; and wherein permitting the user access to the cloud resource also depends on whether the user has been determined to have the associated visitor role.

* * * * *